United States Patent

[11] 3,545,630

| | | |
|---|---|---|
| [72] | Inventor | Osmo Juhani Ivanto<br>Poehj. Puistokatu 10, Hyvinkaa, Finland |
| [21] | Appl. No. | 758,734 |
| [22] | Filed | Sept. 10, 1968 |
| [45] | Patented | Dec. 8, 1970 |

[54] CONVEYOR FOR LOGS
6 Claims, 5 Drawing Figs.

[52] U.S. Cl. .................................................. 214/6,
198/44
[51] Int. Cl. ............................................. B65g 57/11
[50] Field of Search .......................................... 214/6(K),
6(D), 6(H), 6(P)

[56] References Cited
UNITED STATES PATENTS
| | | | |
|---|---|---|---|
| 3,288,038 | 11/1966 | Swartz ........................ | 214/6(H)UX |
| 3,417,854 | 12/1968 | Bilocq ........................ | 214/6(K)UX |

*Primary Examiner*—Gerald M. Forlenza
*Assistant Examiner*—Robert J. Spar
*Attorney*—Waters, Roditi, Schwartz & Nissen ABSTRACT: An arrangement in a conveyor for logs, the conveyor route comprising a number of conveyors arranged in sequence, and on which the logs are moved from one conveyor to the other, the distance between each conveyor subject to being increased so that the logs can be fed vertically downwards from the conveyor to the corresponding points of use; a feeding hopper being arranged under the feeding station and in which an adjustable platform is supported subject to being lowered by means of a pressure cylinder as the logs are fed into the hopper from the conveyors. According to the invention the pressure cylinder is designed as a double cylinder, the cylinders of which are coaxially mounted, the stroke of one cylinder corresponding to the height of the batch of logs fed into the hopper and the stroke of the other cylinder being such that a batch of logs lowered in the hopper by means of the same can be lowered completely below the conveyors.

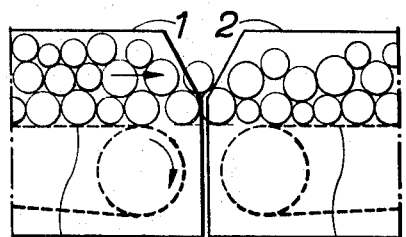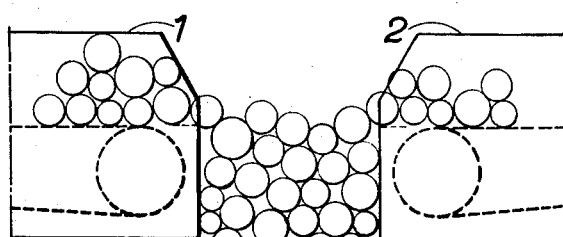

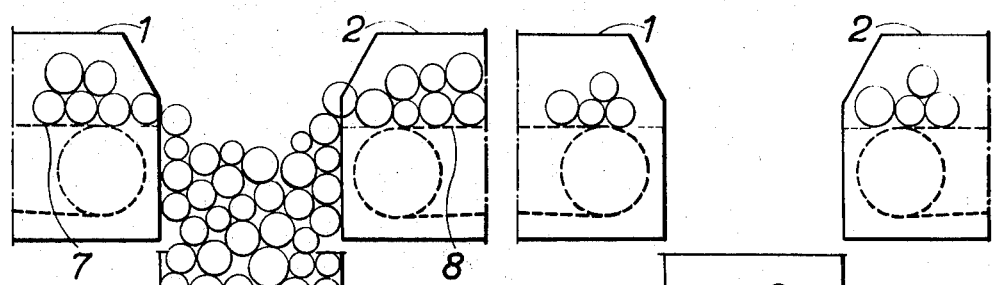
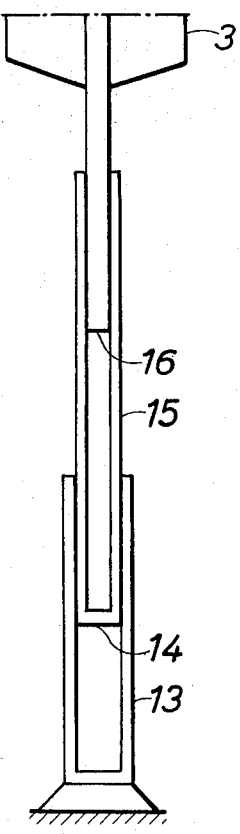

CONVEYOR FOR LOGS

In mechanical pulpmills the grinders which may be, for instance, 10 in number are arranged in rows parallel with the conveyor route on one side of the same, or in pairs on both sides of the conveyor. The conveyor is located higher than the grinders. The logs are fed to the conveyor either from one end or from both ends. The conveyor route is built up of several conveyors arranged in sequence and at the ends of which are provided gaps which may be extended so that logs can drop from the conveyors and be moved into a grinder positioned at the side thereof. The conveyors may be arranged, for instance, in carriages which can be moved parallel with the longitudinal direction of the conveyor route so that the gap between two conveyors can be widened.

Below the gap between two conveyors a feeding hopper into which the logs fall is arranged. However, the logs are not allowed to fall freely since this would mean that they might fall into the feeding hopper in a disorderly fashion, and because it would be necessary to strengthen the feeding hopper greatly in order to withstand freely falling logs. Consequently, an adjustable platform is arranged in the feeding hopper, the said platform being located in the upper position when feeding commences and which can be lowered by means of a pressure cylinder as logs are fed from the conveyors into the hopper.

It is important that equal batches of logs are fed into the hopper at each feeding sequence. This desideratum has been fulfilled in that the movement of the platform is interrupted when it is lowered through a certain distance. The upper surface of the log batch is then approximately at the same level as the upper surface of the conveyors. The feeding of logs into the hopper is then ceased and the platform lowered to such an extent that the logs supported thereon lie entirely below the lower surface of the conveyors, whereby the gap between the conveyors can be closed and the logs may be displaced laterally to the grinder. However, it is not possible to stop the table in this manner each time at an intermediate position which is always located at the same position. This is due to the fact that one batch of logs may weigh as much as double the weight of another batch, since the density of wet wood can vary within very wide limits, and since the logs forming a batch may be somewhat irregularly arranged. Because of the variations in the weight of the batches, the pressure medium is compressed to a greater or lesser extent, and thus the intermediate position of the platform varies. When using characterised hydraulic pressure cylinder the variations in the intermediate position are not very great, but hydraulic arrangements are not arranged; in grinder houses because of the risk of oil leakage, which would damage the wood. When using a pneumatic pressure cylinder the variations in the intermediate positions of the platform are relatively wide.

The object of the present invention is to eliminate the aforementioned disadvantages. The invention is mainly characterised in that the pressure cylinders are designed to form a double cylinder, the cylinders of which are coaxially arranged, the stroke of one cylinder corresponding to the height of the batch of logs fed into the hopper and the stroke of the second cylinder being such that a batch fed into the hopper can be lowered by means of the same completely below the conveyor line. According to the invention, the intermediate position of the adjustable platform is always at the same level, even when using pneumatic cylinders, because lowering of the platform is effected by first utilizing the full stroke of one pressure cylinder and then the full stroke of the second pressure cylinder. The log batches will thus be fairly exactly equal to one another.

The invention is explained with reference to an example illustrated in the accompanying drawings, in which FIGS. 1—4 show different sequences in the formation of a batch of logs;

FIG. 5 shows another version of the pressure cylinders.

In FIG. 1 the gap between the conveyors 1 and 2 is closed. The logs are moved along the conveyor route formed by the conveyors, from left to right. The number of conveyors is equal to the number of grinders or pairs of such. Each conveyor can be moved parallel to the longitudinal direction of the conveyor routes so that the gap between two conveyors can be increased. According to FIG. 1 the gap between the conveyors 1 and 2 lies opposite the center of the feeding hopper 3. However, the gap may also be situated at the edge of the hopper 3, only one conveyor being displaced in the longitudinal direction of the conveyor route in order to open said gap.

According to FIG. 2 the gap between the conveyors 1 and 2 has been opened and a number of logs have been deposited on an adjustable platform 4 in the hopper by means of the two conveyors. The platform 4 is then lowered and more logs are fed into the hopper 3 by means of the conveyors 1 and 2. The platform 4 is attached to the upper end of a piston rod 5. Pressure medium is released from the pressure cylinder 6 in order to lower the platform 4.

In FIG. 3 the batch of logs has been completed. The upper surface of the batch is located approximately at the same level as the conveying belts 7 and 8 of the conveyors 1 and 2. A piston 9 located in the cylinder 6 is at its lower position.

In order to reclose the gap between the conveyors 1 and 2 and so that the batch of logs can be displaced laterally into the grinder, the platform 4 must be lowered still further so that the upper surface of the batch is located completely below the conveyors 1 and 2. For this purpose a second pressure cylinder 10 has been arranged below the pressure cylinder 6. When the pressure medium is released from said cylinder 10, the cylinder 10 moves downwardly relative to a piston 11 mounted on a fixed piston rod 12 such that the upper position in the cylinder 10 moves closely proximate piston 11. The batch of logs is now located completely below the conveyors 1 and 2. This position is shown in FIG. 4. The gap between the conveyors 1 and 2 is then closed and the batch displaced from the hopper 3 by means of a suitable pusher.

FIG. 5 shows another version of the pressure cylinder. The pressure cylinder 13 has been attached at a rigid point. Arranged within said pressure cylinder 13 is a piston 14 the upper end 15 of which serves also as a pressure cylinder. Arranged in the pressure cylinder 15 is a piston 16, the platform being secured to the upper end of this latter piston. The pressure cylinders and pistons according to FIG. 5 are thus positioned telescopically within each other.

The invention is not restricted to the described and shown versions but may, of course, be varied within the scope of the following claims. Thus the arrangement according to the invention, besides being used in mechanical pulpmills, may also be used in installations where wood is disintegrated into chips by means of chippers positioned relative to the conveying line in the same manner as the grinders.

I claim:

1. An apparatus for conveying a batch of logs comprising a first conveyor, a hopper open at the top thereof, means supporting said first conveyor above said hopper for movement transversely of said hopper, means cooperating with said first conveyor above said hopper for controlling the quantity of logs being fed into said hopper by said first conveyor, a vertically adjustable platform extending in said hopper upon which platform the logs are deposited, first power means supporting said platform for controlling the elevation of said platform, and second power means supporting said first power means for controlling the elevation of said first power means and said platform.

2. An apparatus as claimed in claim 1, wherein said means cooperating with said first conveyor above said hopper for controlling the quality of logs being fed into said hopper includes a second conveyor longitudinally spaced from said first conveyor and movable transversely of said hopper toward and away from said first conveyor, for controlling the magnitude of the space between said conveyors.

3. An apparatus as claimed in claim 1, wherein said conveyor includes a conveyor belt for moving said logs toward said hopper, transversely thereof.

4. An apparatus as claimed in claim 1, wherein said first power means is a power cylinder, the stroke of which accommodates said batch of logs extending vertically from the lowermost position of said platform to a position above the uppermost portion of said hopper, and said second power means is a power cylinder, the stroke of which accommodates a lowering of said first power means to a lowermost position whereby the uppermost logs of said batch of logs is below the uppermost portion of said hopper.

5. An apparatus as claimed in claim 4, wherein said first power means includes a movable piston supporting said platform and said second power means includes a fixed piston relative to which fixed piston is movable said power cylinder of said second power means.

6. An apparatus as claimed in claim 4, comprising two telescopically arranged pressure cylinders which operate in the same direction.